US006385059B1

(12) United States Patent
Telefus et al.

(10) Patent No.: US 6,385,059 B1
(45) Date of Patent: May 7, 2002

(54) TRANSFORMER-COUPLED SWITCHING POWER CONVERTER HAVING PRIMARY FEEDBACK CONTROL

(75) Inventors: Mark D. Telefus, Orinda; Mark R. Muegge, Cupertino, both of CA (US)

(73) Assignee: Iwatt, Inc., Los Gatos, CA (US)

( * ) Notice: Subject to any disclaimer, the term of this patent is extended or adjusted under 35 U.S.C. 154(b) by 0 days.

(21) Appl. No.: 09/713,132

(22) Filed: Nov. 14, 2000

(51) Int. Cl.[7] .......................... H02M 3/335; H02M 1/12
(52) U.S. Cl. ................. 363/21.15; 363/21.18; 363/21.07; 363/41
(58) Field of Search ................. 363/21.12, 21.15, 363/21.18, 21.1, 21.04, 21.07, 41, 97, 131

(56) References Cited

U.S. PATENT DOCUMENTS

| 4,819,144 A | * | 4/1989 | Otake | 363/21 |
|---|---|---|---|---|
| 4,975,820 A | * | 12/1990 | Szepesi | 363/21 |
| 5,189,599 A | * | 2/1993 | Messman | 363/21 |
| 5,276,604 A | * | 1/1994 | Messman | 363/65 |
| 5,285,366 A | * | 2/1994 | Zaretsky | 363/56 |
| 5,313,381 A | | 5/1994 | Balakrishnan | 363/147 |
| 5,570,276 A | * | 10/1996 | Cuk et al. | 363/16 |
| 5,680,034 A | * | 10/1997 | Redl | 363/21 |
| 5,815,380 A | * | 9/1998 | Cuk et al. | 363/16 |
| 5,828,558 A | * | 10/1998 | Korcharz et al. | 363/20 |
| 5,841,643 A | | 11/1998 | Schenkel | 363/21 |
| 5,886,586 A | * | 3/1999 | Lai et al. | 332/109 |
| 6,049,471 A | * | 4/2000 | Korchartz et al. | 363/20 |

* cited by examiner

Primary Examiner—Bao Q. Vu
(74) Attorney, Agent, or Firm—Lyon & Lyon LLP

(57) ABSTRACT

Control circuitry for controlling the delivery of power from a source voltage to a load in a transformer coupled power converter. The control circuitry includes a power switch having an input coupled to the source, an output, and an activation gate, the power switch, when cycled ON and OFF, defining a pulses of power at the load. A pulse generator is coupled to the power switch, the pulse generator producing a train of constant frequency, constant ON time switching pulses for driving the power switch activation gate. A pulse rate controller responsive to an error signal is coupled between the pulse generator and the power switch, the pulse rate controller regulating an output voltage at the load by controlling the rate of switching pulses delivered to the power switch activation gate over time. The error signal is derived by estimating the output voltage at each switching cycle from the primary side current, while compensating for the expected loss between the source and the load for each power switch cycle.

13 Claims, 4 Drawing Sheets

TRANSFORMER-COUPLED SWITCHING POWER CONVERTER HAVING PRIMARY FEEDBACK CONTROL

RELATED APPLICATION DATA

This application is related to co-pending U.S. Pat. application Ser. No. 09/713,541 entitled "SWITCHING POWER SUPPLY PACKAGES"], filed the same date herewith; Ser. No. 09/585,928, filed Jun. 2, 2000; Ser. No. 09/540,058, filed Mar. 31, 2000; and Ser. No. 09/444,032, filed Nov. 19, 2000, each of which is fully incorporated herein by reference.

FIELD OF THE INVENTION

This invention pertains generally to the field of power conversion and, more particularly, to switching power supplies with feedback control.

BACKGROUND

Compact and efficient power supplies are an increasing concern to users and manufacturers of electronics. Switching power supplies with pulse width modulated ("PWM") controllers offer both compactness and efficiency in a number of different topologies. Boost and buck switching power supply topologies are efficient, but do not isolate the power input from the power output. Other topologies, such as the flyback, do isolate the power input from the power output by using a transformer. In such topologies, feedback from the secondary (power output) side of the transformer is needed to adjust the pulse width modulation duty cycle of the power switch Prior art PWM controlled isolated power supplies typically regulate the output voltage by directly sensing the output voltage, with feedback to the PWM controller via an isolation device (typically a feedback transformer or opto-isolator). This secondary feedback to the PWM controller sets the pulse widths of the power switch in order to maintain proper output regulation. In particular, secondary feedback requires additional components and related costs to the power supply, and represent design complexity related to loop performance and stability.

For example, U.S. Pat. No. 5,313,381 (the "'381 patent") discloses a three-terminal switching power supply control chip for use with a flyback converter. FIG. 1 illustrates a flyback converter 20 according to the '381 patent. The converter 20 employs a three-pin control chip 22 to supply current from a rectified DC source (Vbb) 28 across an isolating transformer 24 to supply power for a load 26. The power supply chip 22 includes a first terminal 30 coupled to a primary winding 32 of the transformer 24, a second ("ground") terminal 36 coupled to a primary side ground reference, and a third terminal 40 for accepting a combined feedback control signal (IFB) and a bias supply voltage (Vcc) to operate the control chip 22.

Within the power supply chip 22, the first terminal 30 is alternately coupled to the ground terminal 36 by a power transistor switch 42. PWM control circuitry 44 drives the power switch 42 at a variable duty cycle. When the power switch 42 is ON, current flows through the primary winding 32 and energy is stored in the magnetic core 45 of the transformer 24. When the switch 42 is OFF, a secondary diode 46 is forward biased and the stored energy in the transformer core 45 is released through a secondary winding 48 to a filter/storage capacitor 47 and the load 26. After the transformer 24 is reset, the ON/OFF cycle is repeated.

An error amplifier 50 compares the output voltage Vout across the load 26 with a reference voltage to generate the feedback control signal IFB. The bias supply voltage Vcc is supplied from an auxiliary secondary winding 52 of the transformer 24. The bias supply voltage Vcc is modulated with the feedback control signal IFB in an opto-isolator 54 to create the combined bias voltage, feedback signal Vcc/IFB. A feedback extraction circuit (not shown) in the chip 22 separates the feedback signal IFB from the bias voltage Vcc by sensing the excess current flowing through a shunt regulator. The extracted feedback signal IFB is used to control the output of the PWM circuitry 44 to constantly adjust the duty cycle of the power switch 42 so as to transfer greater or lesser current to the secondary.

On the one hand, to properly compensate the PWM controller based on feedback from the secondary requires extra components and often involves expensive re-design, depending upon the particular application. Yet, prior art isolated power supplies that used feedback only from the primary side of the transformer do not properly account for power losses encountered on the secondary side of the transformer. For example, there are prior art PWM controlled isolated power supplies that used feedback only from the primary side of the transformer by deriving the output voltage by sensing input voltage ($V_{IN}$) divided by the turns ratio of the power transformer ($N_P/N_S$). However, this does not take into account transformer core and copper losses, PCB losses and losses attributed to other secondary components. These losses are represented in aggregate as $Z_{ESR}$. When load current is light, output regulation can be achieved, as follows:

$$I_{LOAD} \sim 0A,$$

then $$V_{ESR} \sim 0V,$$

and $$V_{IN}*(N_S/N_P) \sim V_{OUT(SENSE)} \sim V_{OUT(LOAD)}$$

However, as the output load increases, the losses associated with $Z_{ESR}$ are not taken into account in the feedback, negatively impacting output regulation, i.e., when:

$$I_{LOAD} \neq 0A,$$

then $$V_{ESR} \neq 0V,$$

and $$V_{IN}^*(N_S/N_P) \sim V_{OUT(SENSE)} = V_{OUT(LOAD)},$$

because $$V_{OUT(LOAD)} = V_{OUT(SENSE)} - V_{ESR}$$

Because in PWM switching power supplies, incremental losses associated with $Z_{ESR}$ are not linear with changes in load, it is difficult to compensate for these losses over the entire load range. Although this methodology results in a simple and inexpensive feedback circuit, it is unable to meet the load regulation requirements of many end product applications.

For example, U.S. Pat. No. 5,982,644, (the '644 patent) discloses a pulse-width-modulated boost converter coupled to a high voltage converter, which in turn is coupled to the primary side of a transformer. The modulation of the boost converter is adjusted according to an amplified error signal representing the difference between the boost converter's output voltage and the voltage from a current sensing circuit sensing the current through the primary winding. This error signal has no way of sensing and accounting for the losses on the secondary side of the transformer. Thus, the '644 patent power supply employs a linear regulator on the secondary side of the transformer to maintain a constant voltage over the load. Although this power supply avoids the use of feedback from the secondary side of the transformer, it introduces the expense and loss associated with installing an additional regulator at the load.

Thus, it would be desirable to provide power supply packages for accurately controlling isolated power converter topologies, without requiring feedback from the secondary side of the transformer, thereby easing design and reducing the component count. In particular, such power supplies should compensate for secondary $V_{ESR}$ losses over a full range of operating load conditions, thereby reducing design complexity and component cost, and providing improved output load regulation.

SUMMARY OF THE INVENTION

In accordance with the present invention, switching power supply is provided for controlling the delivery of power from a source to a load in a transformer-coupled power converter. The power supply includes a power switch that cycles ON and OFF and couples the source to the load, and further includes control circuitry responsive to an error signal for regulating the output voltage without varying the duty cycle of the power switch.

In a preferred embodiment, the power supply is used to control the delivery of power from a source voltage to a load in a flyback power converter. The control circuitry comprises a pulse generator coupled to the power switch, the pulse generator producing a train of constant frequency, constant ON time switching pulses for driving the power switch. A pulse rate controller responsive to an error signal is coupled between the pulse generator and the power switch. The pulse rate controller thereby regulates an output voltage at the load by controlling the rate of switching pulses delivered to the power switch over time.

When the power switch is ON, current flowing through the primary winding is sensed, and peak detected. The detected peak current for each power switch ON cycle, (encoded as a voltage), is compared to a compensation signal representing an expected power loss between the source and load, e.g., due to transformer winding and diode inefficiencies, represented in aggregate as $Z_{ESR}$, in order to derive an estimate of the source voltage. When the power switch 122 is turned OFF, the drain voltage is sensed after the switching transient, but before the transformer is reset, so as to reflect a "flyback voltage." This flyback voltage is compared to the estimated source voltage to derive an estimate of the output voltage. The estimated output voltage is than scaled and compared to a voltage reference representing a scaled desired output voltage to derive the error signal used for controlling the pulse rate controller.

Other objects and features of the present inventions will become apparent hereinafter.

BRIEF DESCRIPTION OF THE DRAWINGS

The drawings illustrate both the design and utility of the preferred embodiments of the present invention, in which.

DETAILED DESCRIPTION OF THE EMBODIMENTS

Figure 1:
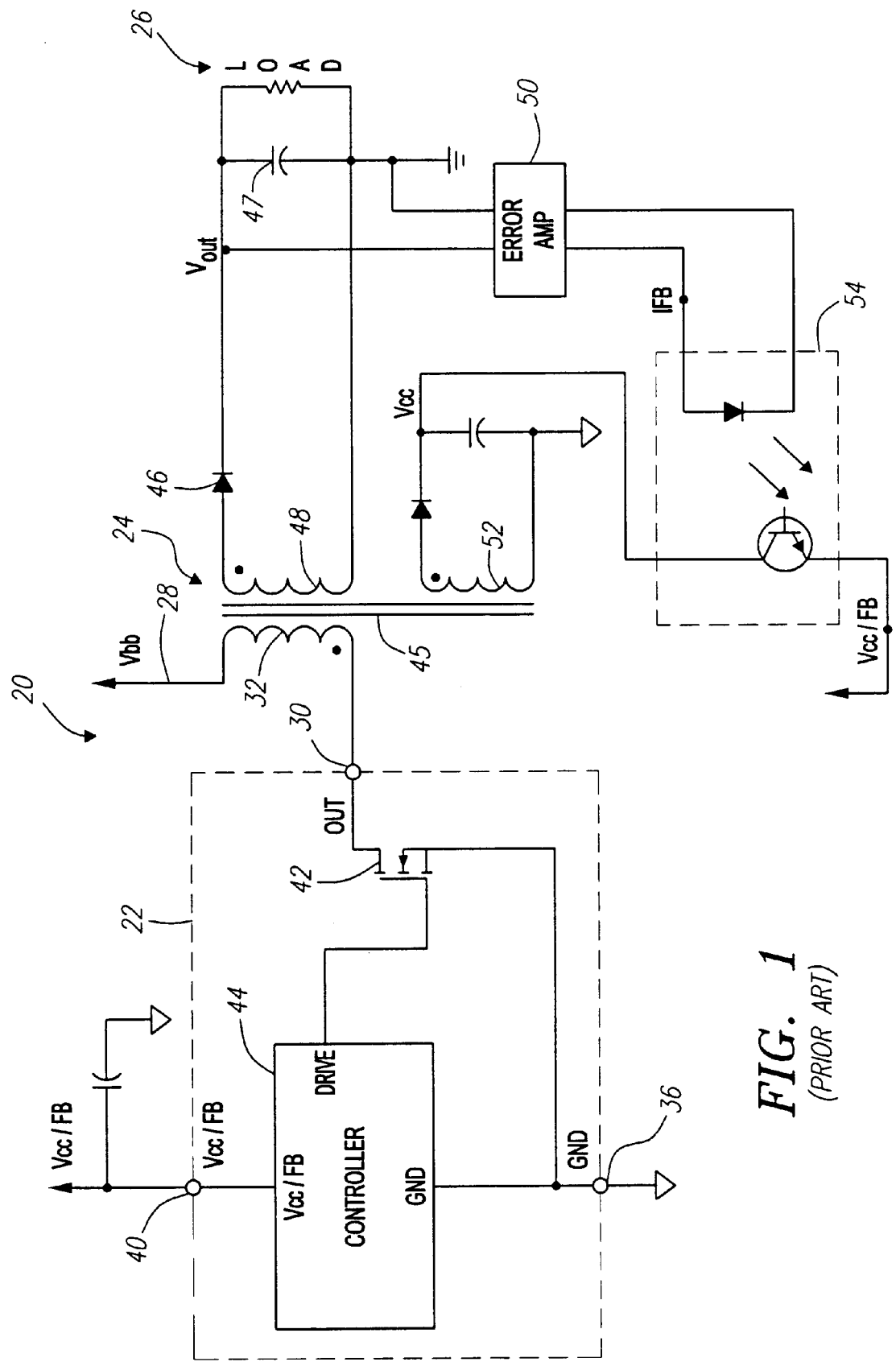
FIG. 1 is a schematic diagram of a flyback converter employing a prior art three-terminal switching power supply chip.
Figure 2:
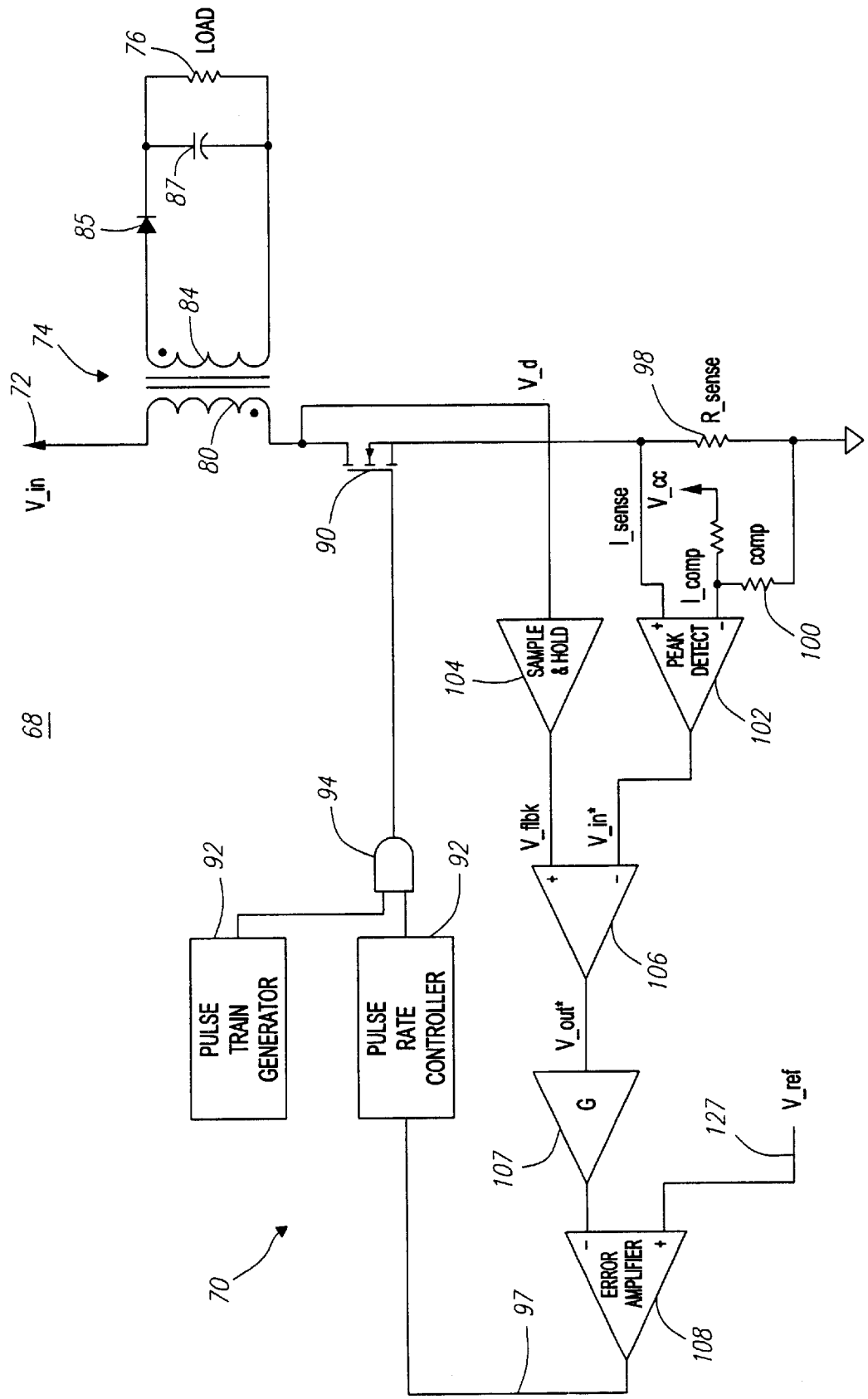
FIG. 2 is a schematic diagram of a transformer coupled flyback converter employing a preferred pulse train power switch controller responsive to a primary side compensation signal for regulating an output load voltage.

FIG. 2 illustrates a flyback converter 68 employing pulse train control circuitry 70 to supply current from a rectified DC source (V_in) 72 across an isolating transformer 74 to supply power to a load 76. The transformer 74 includes a primary winding 80 coupled at one end to V_in 72 and at the other end to the input (drain) terminal of a power switch 90, such that the primary winding 80 is alternately coupled to ground by the power switch 90. Thus, when the power switch 90 is ON, current flows through the primary winding 80 and energy is stored in the magnetic core 82 of the transformer 74. When the power switch 90 is OFF, the current flow through the primary side winding 80 is interrupted and the stored energy in the magnetic core 82 is released through a flyback-biased secondary winding 84 and diode 85 to a filter/storage capacitor 87 and the load 76.

The pulse train control circuitry 70 regulates the number of pulses of power appearing over time at the load 26, and thus the output voltage of the converter 68, by controlling a rate of constant frequency, constant ON time switching pulses output from a pulse generator 92 that activate the power switch 90. The pulse generator 92 outputs a continuous train of switching pulses, preferably at a relatively high frequency, e.g., 1 MHz. The pulse train control circuitry 70 regulates the number of switching pulses that activate the power switch 90 by using a gating function ("gate") 94 controlled by a pulse rate controller 96. In alternate embodiments, the pulse train control circuitry 70 may employ a controllable synthesizer to generate the switching pulses on demand, as needed.

In particular, the pulse rate controller 96 is responsive to a feedback error signal 97 for controlling the rate of pulses delivered to the power switch 90 based current output load conditions. Unlike a PWM control technique, the switch ON time and frequency are uncoupled from the output conditions of the load 76, and instead are selectively applied to the gate of the power switch 90 to maintain a desired output power level. Because the switching pulses generated by the pulse generator 92 are uncoupled from output regulation, the pulses have a constant ON time and frequency. In turn, because each switching pulse and, thus, each corresponding "power pulse" sent to the load 76, is of uniform duration, the losses resulting from $Z_{ESR}$ over each power pulse are also constant. Therefore, the total losses (represented by $V_{ESR}$) have a linear relationship to the number of power pulses, or $V_{ESR}$=(# of power pulses)*($V_{ESR}$ per pulse), where ($V_{ESR}$ per pulse)=constant. As such, output voltage using only primary side feedback is capable of compensating for $Z_{ESR}$ losses ($V_{ESR}$), because: if $I_{LOAD}$~0A, then $V_{ESR}$~0V, and $V_{IN}*(N_S/N_P)$~$V_{OUT(SENSE)}$~$V_{OUT(LOAD)}$, where $N_S/N_P$ is the turns ratio of the transformer windings 84/80.

When |the output load 76 increases, losses associated with $Z_{ESR}$ ($V_{ESR}$) are compensated for, maintaining output regulation, where: $I_{LOAD}$=/=0A, then $V_{ESR}$=(# pulses)* ($V_{ESR}$per pulse), where ($V_{ESR}$per pulse)=constant, and $V_{IN}*(N_S/N_P)$~$V_{OUT(SENSE)-VESR}$~$V_{OUT(LOAD)}$. Thus, the losses for each switching cycle through the transformer windings, secondary diodes, etc., are constant regardless of load conditions, and may be represented by a compensation signal, I_comp, set by a fixed resistance 100.

Figure 3A:
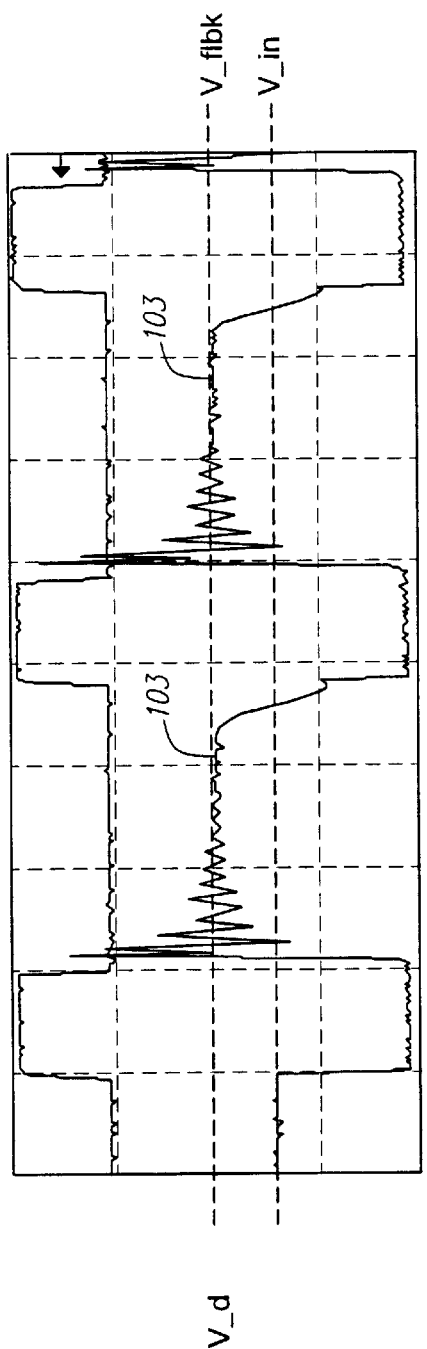
FIG. 3A is a measured primary side voltage signal sensed at the drain terminal of the power switch in the converter of FIG. 2.
Figure 3B:
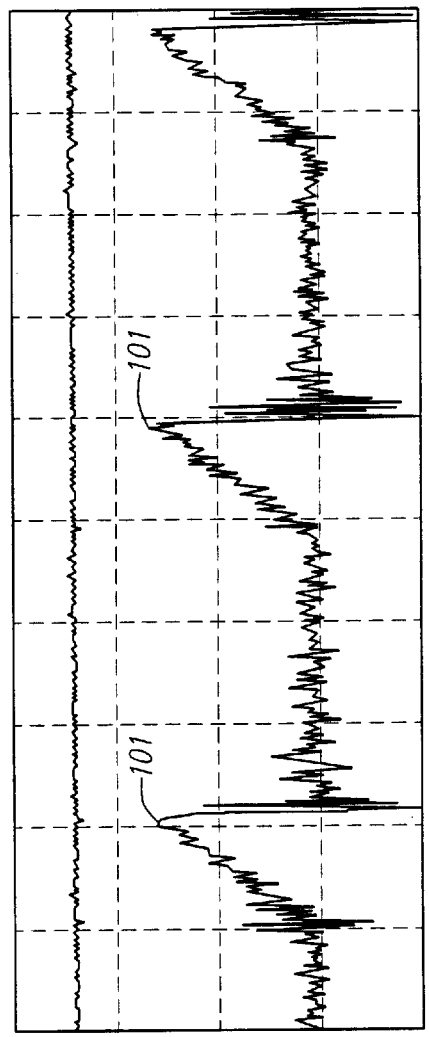
FIG. 3B is a measured primary side current signal sensed at the source terminal of the power switch in the converter of FIG. 2.

With reference also to FIGS. 3A and 3B, the error signal 97 is generated as follows:

While the switch 90 is ON, current through the primary winding 80 and, accordingly, through switch 90 will ramp up, reaching a peak (indicated by reference number 101 in FIG. 3B) at the moment just before the switch 90 is turned OFF. The primary current is sensed (and peak detected) employing a small current sensing resistor 98. In alternate embodiments, other current sensing means, such as, e.g., a Hall sensor, may be used. The sensed current signal, I_sense, (encoded as a voltage) is compared in op amp 102 to the compensation signal I_comp to derive an estimated value (designated as V_in*) of the input voltage V_in 72. To derive V_in*, where V_in* =$L/T_{ON}*I_{peak}$, where L is the effective inductance of the primary winding 80, $T_{ON}$ is the ON time of each switching cycle and Ipeak is the peak primary maximum current 101 for each switching cycle, the gain of op amp 102 is set to a ratio $L*T_{ON}/R\_sense$, where R_sense is the resistance of the sense resistor 98.

When the switch 90 is OFF, the voltage at the drain terminal is sensed and sampled by a voltage sense amp 104. In particular, the drain voltage is sensed after the switching transient, but before the transformer is reset (indicated by reference number 103 in FIG. 3A), so as to reflect the "flyback" voltage (designated as V_flbk), following each switching cycle.

The flyback voltage V_flbk is momentarily held in the voltage sensing amp 104 and then compared during the next ON switching cycle to the estimated input voltage V_in* in op amp 106 having a gain set to the turns ratio $N_S/N_P$ to derive an estimated output voltage V_out*, according to the relationship V_out*=(V_flbk−V_in*)*$N_S/N_P$. In alternate embodiments, the sensed peak current signal I_sense may be held and then compared to the subsequently sensed flyback voltage V_flbk. In other words, it is sufficient for practicing the invention that the I_sense and V_flbk signals are sensed relatively close in time, e.g., from the same or neighboring power switch ON cycles.

The estimated output voltage V_out* is scaled to an appropriate level by amp 107, with the scaled (estimated) output voltage compared in op amp 108 to an internal reference voltage V_ref 127, where V_ref is set to a scaled version of the desired output voltage to be maintained by the converter 68, irrespective of load conditions. Notably, in alternate embodiments, V_ref reference voltage. The difference between the scaled estimated output voltage V_out* and the reference voltage V_ref forms the feedback error signal 97 input into the pulse rate controller 96 for regulating the rate of switching pulses delivered to the power switch 90. For example, in one embodiment, the error signal 97 is a scaled voltage (determined by the gain of op amp 108 ) from zero to one volt, where "zero" means no switching pulses from the pulse generator 92 are released by the gate 94, and "one" means 100% of the switching pulses are released by the gate 94. If the scaled estimated output voltage V_out* is less than the reference voltage V_ref, the error signal 97 will increase, causing a corresponding increase in the rate of output switching pulses the gate 94 and, thus, output voltage of the converter 68. If the scaled estimated output voltage V_out* is greater than the reference voltage V_ref, the error signal 97 will decrease, causing a corresponding decrease in the rate of switching pulses released by the gate 94 and, thus, the output voltage of the converter 68.

In alternate embodiments, the pulse rate controller 96 may also regulate the rate of delivered switching pulses based on fluctuations in the input voltage V_in. For example, under high input voltage and low output load conditions, the rate of switching pulses over time would be relatively low. As the input voltage decreases or the output load increases, the rate of switching pulses is then increased. Also, it alternate embodiments, the reference voltage V_ref 127 may be scaled, rather than scale the estimated output voltage V_out*, in order to accomplish appropriate comparison level for generating the feedback error signal 97.

A more detailed description of the principle and operation of various pulse train controller 120 embodiments is provided in commonly assigned U.S. Pat. application Ser. No. 09/585,928, filed Jun. 2, 2000, which is fully incorporated herein by reference.

Figure 4:
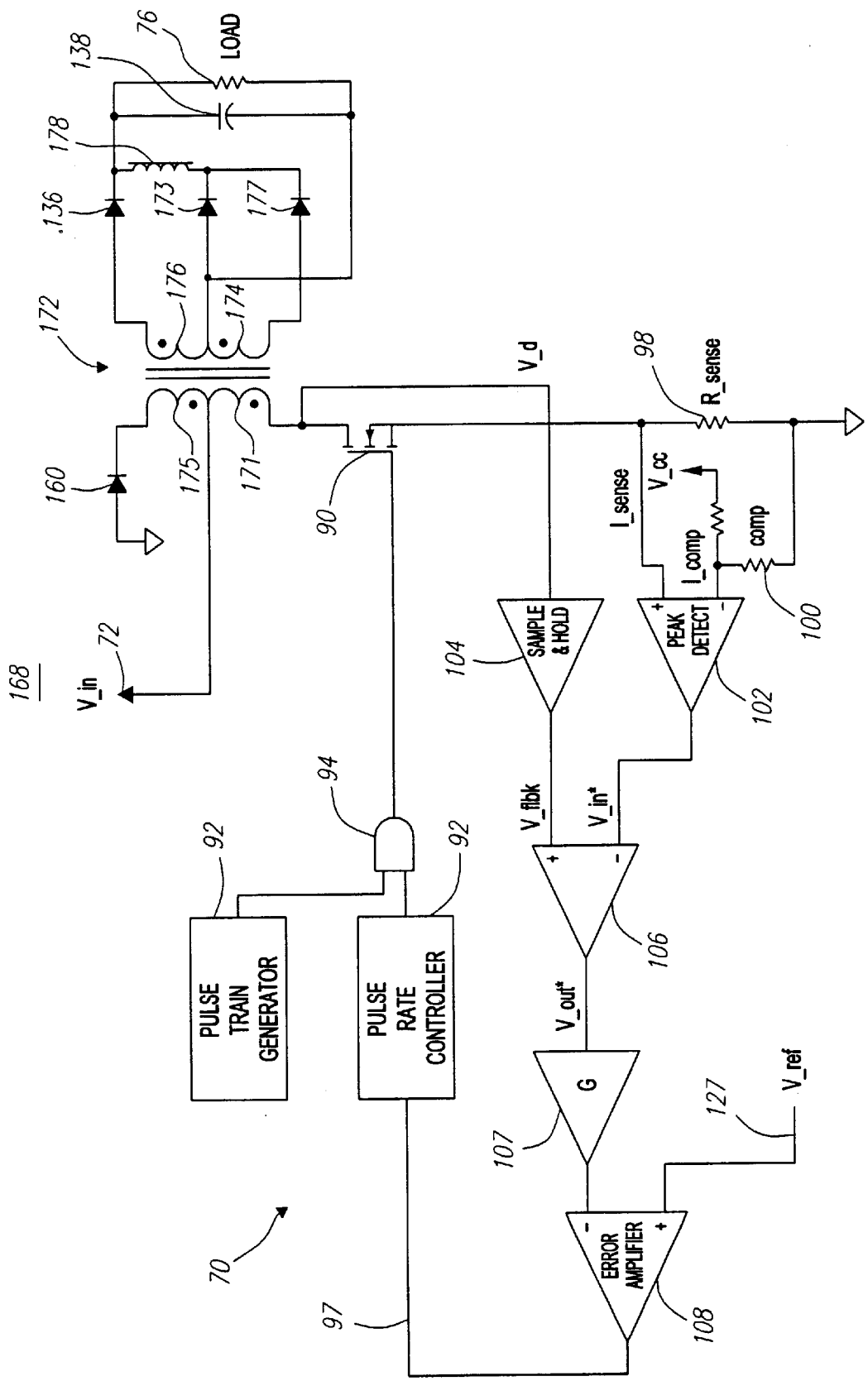
FIG. 4 is a schematic diagram of a transformer coupled converter having both forward and flyback biased secondary windings and employing the pulse train controller of the converter FIG. 2.

FIG. 4 depicts an alternate converter topology 168 employing the pulse train control circuitry 70 to supply current from the DC source V_in 72 across an isolating transformer 172 to supply power to the load 26. The first terminal of the control package 72 is coupled to a first end of a first primary winding 171 of transformer 172, with the second end of the first primary winding 171 coupled to V_in 72. V_in is also coupled to a first end of a second ("reset") primary winding 175 of transformer 172. A second end of the reset winding 172 is coupled to the primary side ground reference via a voltage clamping diode 160.

Operation of the converter 168 is as follows:

When the power switch 90 is ON, current flows through the first primary winding 171 and is transferred through a forward-biased secondary winding 176 and diode 136 to a filter/storage capacitor 138 and the load 26. Energy is also stored in the magnetic core of the transformer 172. When the switch 90 is OFF, energy stored in the transformer core is transferred as current through a flyback-biased secondary winding 174 and diode 177, via a filter inductor 178, to the filter/storage capacitor 138 and load 26. Current also flows in the "reverse" direction through the clamping diode 160 and reset winding 175, some of which is also transferred to the flyback-biased secondary winding 174. A further secondary diode 173 is provided to transfer any remaining current from the flyback-biased secondary winding 174 "pulled" by the current flow through the filter inductor 178 to the load 26, once the voltage across diode 177 drops to its reverse bias point. After the transformer 172 is reset, the ON/OFF cycle of switch 90 is repeated by the next switching pulse delivered from the pulse train controller 120.

Operation of the pulse train control circuitry 70, including generation of the primary side feedback error signal 97 is identical to the operation in converter 68. Notably, while the peak voltage at the drain terminal of switch 90 is effectively clamped by diode 160 to protect the power switch 90, this limiting does not impact the flyback voltage V_flbk sensed by the voltage sensing circuit 104.

Although the invention has been described in terms of the presently preferred embodiments, it will be understood by those skilled in the art that many other embodiments and variations of the invention are possible after having read the disclosure. Accordingly, the invention is not to be limited except in accordance with the appended claims and their equivalents.

What is claimed:

1. Control circuitry for controlling the delivery of power from a source voltage to a load in a transformer coupled power converter, the control circuitry comprising:

a power switch having an input, an output, and an activation gate, the power switch, when cycled ON and OFF, defining a pulse of power at the load;

a pulse generator coupled to the power switch, the pulse generator producing switching pulses for cycling the power switch;

a pulse rate controller responsive to an error signal and coupled between the pulse generator and the power switch, wherein the pulse rate controller regulates an output voltage at the load by controlling the rate of switching pulses that cycle the power switch over time; and error signal generation circuitry coupled to the power switch output for generating the error signal based at least in part on a compensation signal corresponding to an expected loss between the source and the load for each power switch cycle.

2. The control circuitry of claim 1, further comprising current sensing circuitry for sensing a current flow through the power switch output.

3. The control circuitry of claim 2, wherein a peak current through the power switch output for each power switch cycle is sensed and compared with the compensation signal to derive an estimate of the source voltage.

4. The control circuitry of claim 3, the power converter transformer having a flyback-biased secondary winding, the control circuitry further comprising a voltage sensing circuit for sensing a flyback voltage at the power switch input following each power switch cycle, wherein the sensed flyback voltage is compared to the estimated source voltage derived in the same or a neighboring power switch cycle in order to derive an estimate of the output voltage.

5. The control circuitry of claim 4, further comprising a reference voltage set to a scaled desired output voltage, wherein the estimated output voltage is scaled and the error signal is derived by comparing a scaled estimated output voltage to the reference voltage.

6. The control circuitry of claim 4, the power converter transformer further comprising a forward-biased secondary winding.

7. A switching power supply for controlling the delivery of power from a source to a load in a transformer coupled power converter, comprising:

a power switch that cycles ON and OFF and couples the source to the load; and control circuitry responsive to an error signal for regulating the output voltage without varying the duty cycle of the power switch.

8. The power supply of claim 7, wherein the control circuitry comprises a pulse generator coupled to the power switch, the pulse generator producing switching pulses for cycling the power switch;

a pulse rate controller responsive to an error signal and coupled between the pulse generator and the power switch, wherein the pulse rate controller regulates an output voltage at the load by controlling the rate of switching pulses delivered to the power switch over time; and error signal generation circuitry coupled to an output of the power switch for generating the error signal based at least in part on a compensation signal corresponding to an expected loss between the source and the load for each power switch cycle.

9. The power supply of claim 8, further comprising current sensing circuitry for sensing a current flow through the power switch.

10. The power supply of claim 9, wherein a peak current through the power switch for each power switch ON cycle is sensed and compared with the compensation signal to derive an estimate of the source voltage.

11. A transformer-coupled power converter employing the switching power supply of claim 10, the transformer having a flyback-biased secondary winding, the control circuitry further comprising a voltage sensing circuit for sensing a flyback voltage at a drain terminal of the power switch following each power switch ON cycle, wherein the sensed flyback voltage is compared to the estimated source voltage derived in the same or a neighboring power switch ON cycle in order to derive an estimate of the output voltage.

12. The power converter of claim 11, the control circuitry further comprising a reference voltage set to a scaled desired output voltage, wherein the estimated output voltage is scaled and the error signal is derived by comparing the scaled estimated output voltage to the reference voltage.

13. The power converter of claim 11, further comprising a forward-biased secondary winding.

* * * * *